United States Patent
Klaassen et al.

(10) Patent No.: US 11,713,839 B2
(45) Date of Patent: Aug. 1, 2023

(54) FLANGE

(71) Applicant: Siemens Gamesa Renewable Energy A/S, Brande (DK)

(72) Inventors: Mark Klaassen, Voorburg (NL); Erwin de Jong, The Hague (NL)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 16 days.

(21) Appl. No.: 17/361,374

(22) Filed: Jun. 29, 2021

(65) Prior Publication Data
US 2022/0003344 A1 Jan. 6, 2022

(30) Foreign Application Priority Data
Jul. 2, 2020 (EP) .................................... 20183603

(51) Int. Cl.
*F16L 23/032* (2006.01)
*F03D 13/20* (2016.01)

(52) U.S. Cl.
CPC ............ *F16L 23/032* (2013.01); *F03D 13/20* (2016.05); *F05B 2260/30* (2013.01)

(58) Field of Classification Search
CPC ........ F03D 13/20; F16L 23/032; F16L 23/036
See application file for complete search history.

(56) References Cited

U.S. PATENT DOCUMENTS

| | | | | |
|---|---|---|---|---|
| 3,219,370 A | * | 11/1965 | Carl | G21C 13/02 376/205 |
| 10,378,516 B2 | * | 8/2019 | Hoeeg | E04H 12/085 |
| 2005/0206160 A1 | * | 9/2005 | Ericksen | F16L 37/0915 285/308 |

(Continued)

FOREIGN PATENT DOCUMENTS

| | | |
|---|---|---|
| EP | 2009202 A2 | 1/2009 |
| EP | 2535485 A1 | 12/2012 |

(Continued)

OTHER PUBLICATIONS

European Search Report dated Dec. 4, 2020 for application No. 20182603.8.

*Primary Examiner* — Courtney D Heinle
*Assistant Examiner* — Ryan C Clark
(74) *Attorney, Agent, or Firm* — Schmeiser, Olsen & Watts LLP

(57) ABSTRACT

Provided is a flange for connecting to a complementary flange, and wherein the flange includes a first flange-segment and a second flange-segment, wherein a) the first flange-segment includes a primary bolt circle including an annular arrangement of inclined openings; and a first annular connection face adapted to lie against a complementary second annular connection face of the second flange-segment; and b) the second flange-segment includes on two opposite sides annular connection faces adapted to lie against complementary annular connection faces; a primary aperture circle including an annular arrangement of openings; and a second body section with a secondary bolt circle including an annular arrangement of openings. Also provided is respective flange-segments, a method for manufacturing such flange and a tower construction.

15 Claims, 6 Drawing Sheets

(56) References Cited

U.S. PATENT DOCUMENTS

| | | | |
|---|---|---|---|
| 2006/0123735 A1* | 6/2006 | Fuellhaas | F03D 13/20 52/741.13 |
| 2007/0086854 A1* | 4/2007 | Blanton | F01D 25/243 415/232 |
| 2009/0000227 A1 | 1/2009 | Jakubowski et al. | |
| 2010/0237614 A1* | 9/2010 | Howard | F16L 23/032 285/405 |
| 2011/0154757 A1* | 6/2011 | Rosengren | F03D 13/20 52/651.01 |
| 2013/0115054 A1 | 5/2013 | Haraguchi et al. | |
| 2017/0211528 A1* | 7/2017 | Nola | F02M 35/10032 |
| 2019/0071862 A1* | 3/2019 | White | F16B 7/182 |

FOREIGN PATENT DOCUMENTS

| | | | | |
|---|---|---|---|---|
| NL | 1004960 C1 | 7/1998 | | |
| WO | WO 2009132659 A2 | 11/2009 | | |
| WO | WO-2013097865 A1 | * 7/2013 | ........... | E04H 12/085 |
| WO | WO 2017040019 A1 | 3/2017 | | |

* cited by examiner

FLANGE

CROSS-REFERENCE TO RELATED APPLICATIONS

This application claims priority to European Application No. 20183603.8, having a filing date of Jul. 2, 2020, the entire contents of which are hereby incorporated by reference.

FIELD OF TECHNOLOGY

The following describes a flange for connection to a complementary flange, special elements of this flange and a method of constructing such flange.

BACKGROUND

Tall towers such as wind turbine towers are generally constructed by connecting tower sections together. To this end, each tower section is equipped with flanges. A common flange shape is the "L-flange", and complementary L-flanges are connected together by fasteners, such as bolts, arranged in a bolt circle. Tower sections may be manufactured to have L-flanges with inner bolt circles (i.e., the flange extends into the tower interior) or outer bolt circles (i.e., the flange extends outward from the tower).

Large wind turbines of the types currently in development have very long rotor blades and therefore require taller towers. However, the limited load-bearing capacity of the commonly used L-flange connection places constraints on the tower structure.

To provide a better flange connection, lately so-called X-flanges are used. The key feature of these new flanges is the ability to transfer much higher loads compared to conventional (L-) flanges, mentioned above. First ideas of an X-flange are e.g. described in patent NL C 1004960. X-flanges are often combined with the L-shape, resulting in an 'XL-flange', i.e., a flange with an L-circle of apertures (often an inner circle) and a region of X-shaped apertures. Thus, the XL-flange is special a variant of the X-flange.

Flanges are usually machined from forged rings e.g. 6-8 m diameter with a rectangular cross-section of e.g. 400×400 mm (see e.g. dashed outer rectangle in FIG. 1). At first, a machining allowance is removed from the forging to ensure that all surface imperfections are removed, after which the product is shaped on a large turn-table. The XL flange requires larger forgings compared to L-flanges and larger forgings imply more steel and therefore more raw material cost.

The reasons that the XL-flange requires a larger forging are that the L-extension (right part of FIG. 1) increases the width of the forged ring. As the L-part has a height restriction (due to design rules) a lot of material has to get machined away (see small, dashed rectangle in FIG. 1). This waste portion cannot be reduced due to the dimensions of the welding neck, since the height of this welding neck is substantial. This is due to non-destructive testing (NDT) (inspection) requirements of the weld. Sufficient space is required below the weld to place a probe with which to send ultra-sonic signals.

Thus, although the XL-flange solves numerous challenges (e.g. providing an interface to connect with, reducing equipment cost) it does lead to the disadvantage that it is larger and more costly due to a bigger raw part and an elaborate manufacturing process.

SUMMARY

An aspect relates to an improved flange connection that overcomes the problems described above.

A flange according to embodiments of the invention is adapted for connecting to a complementary flange (two flanges are typically connected with each other) and comprises a first flange-segment and a second flange-segment. These two flange segments can be connected with each other, e.g. by bolts or screws, welding or an adhesive layer, however, they also can be connected in the course of a connection with a complementary flange.

a) The first flange-segment comprises the following features:

A primary bolt circle comprising an annular arrangement of inclined openings (in order to result in an X-flange) adapted to receive a set of fasteners for connecting the flange to the complementary flange.

A first annular connection face to lie against a complementary second annular connection face of the second flange-segment. The annular connection faces of the two flange-segments should custom-fit with each other, e.g. have a flat shape or at least a corresponding, where the one connection face is the negative form of the other connection face. It is clear, that the expression "annular connection face" refers to a flange facing surface and is not a circumferential surface.

b) The second flange-segment comprises the following features:

It has on one side a second annular connection face adapted to lie against the complementary first annular connection face of the first flange-segment.

It has on an opposite side a third annular connection face adapted to lie against a complementary annular connection face of the complementary flange or a complementary annular connection face of another first flange segment. Thus, the three connection faces are "stacked" upon another. Concerning a connection between two flanges according to embodiments of the invention upon another, there is at the bottom the first flange-segment with its first connection face on the top, touched by the second connection face at the bottom of a second flange-segment with its third connection face on the top, touched by the third connection face at the bottom of the other second flange-segment with again its second connection face on the top, touched by the first connection face at the bottom of the other first flange-segment.

A first body section with a primary aperture circle comprising an annular arrangement of openings designed to let through a set of fasteners for connecting the flange to the complementary flange or to another first flange segment to and from the primary bolt circle of the first flange-segment. Thus, the apertures of the primary aperture circle should correspond to the inclined openings of the primary bolt circle of the first flange-segment so that bolts can be pushed through both when the two flange-segments are arranged upon another. The apertures of the primary aperture circle can be inclined or straight as long as the bolts fit correctly.

A second body section with a secondary bolt circle comprising an annular arrangement of openings to receive a set of fasteners for connecting the flange to an interim structure or to the complementary flange. This is the L-section of the flange. This L-section is only part of the second flange-segment and not of the first flange-segment, since then the manufacturing of the flange is much less expensive because of the smaller and regular cross sections of the flange segments.

By using two separate flange segments, i.e., to "split" the flange up into two parts, the total material that has to be removed from forgings is much less than of conventional XL-flanges and the forged raw parts are smaller, resulting in easing the forging process, since thick forgings are more difficult and costly to manufacture per kg compared to lighter forgings. Splitting the forging into two parts also opens up the way to allow NDT (examinations) from below the first flange-segment. Since it opens up the view of the weld from below. This potentially allows the weld neck to be reduced in size, further decreasing the size of the forging.

It should be noted that the flange segments can come along with additional parts, e.g. an additional thin layer, especially of rubber, grout and/or adhesive, between the two flange-segments. Furthermore, the flange-segments can be further segmented, especially the second flange segment. It can be segmented perpendicular to the apertures of the secondary bolt cycle (or parallel to the connection faces), e.g. in form of a pile of layers, or segmented such that two or more concentric rings are formed, e.g. if the primary aperture circle consists of only one annular aperture. The further segmentation is described more accurately below.

The first flange-section preferably comprises connection means, especially a welding neck, adapted to connect the flange to a constructional element. These connection means are preferably positioned at the opposite side of the first connection face.

Thus, embodiments of the invention allow the construction of a flange, especially an X-flange, particularly preferably an XL-flange, out of two parts. As said above, this greatly reduces the amount of machining, material waste and forging size. A relatively small forging will be required following embodiments of the invention for the top and bottom parts (first and second flange-segment). Less drilling and tapping under an angle is also possible now (reduced depth), one of the most costly production steps. The second flange-segments of corresponding flanges are nearly identical apart from the fact that their apertures (e.g. slotted holes) may alternate. However, identical flange segments could be arranged slightly distorted to fit. This improves the structural integrity of these rings. It is possible to increase the size of the (slotted) apertures of the primary aperture circle and make them equal i.e., the width of these holes would increase, removing more material from the mid-ring. Slotted holes are easier to machine (or cut e.g. with a waterjet, plasma, or oxyfuel) compared to drilling inclined holes. This saves cost. Another embodiment could be to use an outer and inner ring, where the primary aperture circle would be the distance between these rings.

Furthermore, 'thin' forgings provide better material properties due to the way steel cools and crystalizes. Thinner forgings are also easier to manufacture due to the need of smaller ingots, less heating, smaller presses possible and shorter cooling time, and are therefore favored to one big thick forging.

A first flange-segment according to embodiments of the invention is designed for a flange according to embodiments of the invention. The first flange segment comprises the following components (see also the corresponding description of the flange):

A primary bolt circle comprising an annular arrangement of inclined openings to receive a set of fasteners for connecting the flange to the complementary flange.

A first annular connection face adapted to lie against a complementary second annular connection face of a second flange-segment of the flange.

A second flange-segment according to embodiments of the invention is designed for a flange according to embodiments of the invention. The second flange segment comprises the following components (see also the corresponding description of the flange):

On one side a second annular connection face adapted to lie against the complementary first annular connection face of a first flange-segment of the flange.

On an opposite side a third annular connection face to lie against a complementary annular connection face of the complementary flange or against a first annular connection face of another first flange-segment.

A first body section with a primary aperture circle comprising an annular arrangement of openings designed to let through a set of fasteners for connecting the flange to the complementary flange to and from the primary bolt circle of the first flange-segment.

A second body section with a secondary bolt circle comprising an annular arrangement of openings to receive a set of fasteners for connecting the flange to an interim structure or to the complementary flange.

A method of assembly of a flange according to embodiments of the invention, comprises the following steps (not necessarily in this order):

Connecting the first flange-segment to a cylindrical tower section of a tower, e.g. by welding screwing or riveting.

Connecting the second flange-segment to the first flange-segment, especially with the use of connection bolts. The number of bolts required as well as their size depends on the amount of shear load that needs to be transferred. It is clear that the two flange-segments meet with their connection faces (first connection face touches second connection face).

It is further preferred to arrange a (thin) intermediate layer between the first flange-segment and the second flange-segment. Such intermediate layer may compensate imperfections of the annular connection faces and may improve the contact and the cohesion between the two connection faces.

A tower according to embodiments of the invention, is preferably adapted for a wind turbine, but can also be used for other applications, e.g. a monopile or a simple tower. It comprises a plurality of essentially cylindrical tower sections equipped with flanges according to embodiments of the invention that are permanently connected by fasteners inserted through the inclined openings in the primary bolt circles of the flanges. The flanges can be between two adjacent tower sections, but can also be used as transition piece connecting a foundation and the (bottom) tower section or the upper tower section with a nacelle or another structure on top of the tower.

In the following, for the sake of simplicity but without restricting embodiments of the invention in any way, it may be assumed that the tower section is a wind turbine tower section. However, just as example, not restricting the general use for any sort of tower built from segments. A tower section may also be referred to as a "tower shell". An embodiment of the inventive flange is "part of" the tower section at the time when the tower sections are being connected. This shall be understood to mean that a tower segment and its flange may be regarded as a single entity. The tower segment and its flange may be formed as a single body. Equally, the tower segment and its flange may be manufactured separately and then joined, for example a flange may be welded to a steel tower shell, or the upright cylindrical portion of a flange may be embedded in an outer end of a concrete tower shell.

The primary bolt circle and the primary aperture cycle shall be understood as the circles along which lie the openings at the flange connection face. The diameter of the primary bolt circle and the primary aperture cycle may be assumed to be similar or equal to the mean diameter of the tower section or tower shell. The inclined openings/the (slotted) apertures of the primary aperture cycle extend from a connection face into the body of the flange. An advantage of the primary bolt circle is that the joint is effectively moved "into" the tower shell, i.e., the force exerted by a tightened bolt is directed along an inclined path that intersects the mean diameter of the tower shell. This means that loads are much more effectively transferred from one tower shell to the next tower shell. In contrast, the vertical bolts of a conventional L-flange are always at a distance removed from the mean diameter of the tower shell, so that the load path is offset, resulting in greater bending moments. The inclination has preferably to be understood that adjacent bolts are arranged in an X-shape in the primary bolt circle and the primary aperture cycle.

The openings of the secondary bolt circle (L-part) may be assumed to be vertical in the conventional sense, i.e., perpendicular to the connection face of the flange. The secondary bolt circle is e.g. provided for connection to an interim structure, and could then overcome the practical difficulties that would be associated with using the primary bolt circle (with its inclined openings) for this purpose.

With its primary bolt circle and secondary bolt circle, the inventive flange effectively offers structural strength comparable to that of a T-flange without sacrificing the main advantage of the L-flange, namely access to the primary bolt circle from within the tower interior. The L-part may also be used as an additional connection between two flanges. An "interim structure" may be any apparatus such as a holding structure used during transportation of the tower section, a lifting interface used during installation of the tower section, etc.

The terms "flange" and "complementary flange" are to be understood in the usual sense to mean flanges that are essentially identical, e.g. mirror images of each other, so that they can be connected together.

The tower section may be assumed to have an essentially cylindrical form, for example a straight cylinder (although it may also have the shape of a prism). Equally, a tower section may have a frusto-conical form so that, for example, the diameter at its upper end is smaller than the diameter at its lower end. The tower section may be assumed to have an essentially circular cross-sectional shape. The tower section may be assumed to be "solid", i.e., to have solid side walls, for example of steel or concrete, although the inventive flange connection is not limited to tower sections with solid side walls.

Since the inventive flange combines two types of bolt circle, namely a bolt circle with alternating inclined fasteners and the bolt circle known from the "L-flange", the inventive flange may be referred to as an "XL-flange". The "XL-flange" has a favorably high load-bearing capacity because of the alternating arrangement of inclined bolts and because the bolts "cross each other" along a ring that coincides with, or is at least very close to, the tower shell diameter. This results in a more efficient load path, so that prying moments of the type that typically arise in L-flange connections are essentially eliminated. The load-bearing capacity of the inventive flange is comparable to the load-bearing capacity of a comparable "T-flange". However, unlike the conventional art "T-flange", assembly of a tower using the inventive "XL-flange" does not require access from the outside of the tower. This is because all fasteners or studs of the primary bolt ring can all be inserted from inside the tower. This aspect is especially important for the assembly of towers at offshore locations, or at locations in which external cranes cannot be deployed to provide access platforms for personnel. A special advantage of the inventive flange is that it provides a XL-flange with all its advantages but without the disadvantage of much waste, effort and costs for manufacturing.

The inventive flange essentially comprises a first flange-segment that incorporates the primary bolt circle, and a second flange-segment that incorporates the primary aperture circle (corresponding to the holes of the primary bolt circle so that bolts fit through both) and the secondary bolt circle. In the following, it may be assumed that the flange has the general shape of an "L", i.e., the second flange-segment of the flange is essentially a lip or collar that extends into the interior space of the tower section.

An inclined opening of the primary bolt circle is characterized by the angle of inclination $\theta$ subtended between its longitudinal axis and a surface normal of the flange connection face. In other words, the longitudinal axis of a primary bolt circle opening is inclined relative to the vertical plane. In an embodiment of the invention, this angle of inclination $\theta$ measured with respect to the vertical axis (or mid-plane axis of the tower shell) is between 5° and 45°, preferably is at least 10° and/or preferably at most 30°, particularly preferably between 15° and 25°.

In an embodiment of the invention, the primary bolt circle comprises an alternating arrangement of downward-extending inclined openings and upward-extending inclined openings. In an embodiment of the invention, using an "upper" flange for the purpose of discussion, a downward-extending inclined opening extends through the flange to accommodate the shank of a fastener extending into a complementary inclined opening of the lower flange, and an upward-extending inclined opening extends from the connection face partway into the flange to accommodate the threaded end of a fastener extending into the flange from the "lower" flange.

A downward-extending inclined opening is a through-opening formed such that a fastener inserted through the flange extends into an inclined opening of the complementary flange. The downward-extending inclined openings are therefore "through-holes" since they extend all the way through the body of the flange (continued by the apertures of the primary aperture circle).

An upward-extending inclined opening is a threaded opening formed to receive the threaded end of a fastener inserted into the flange via an inclined opening of the complementary flange and the primary aperture circle of the second flange-segment of the present flange. The upward-extending inclined openings are therefore "blind holes" since they terminate in the body of the flange.

When viewed from the contact surface, the flange therefore shows a ring of openings. Every second opening is an "exit" opening of the inclined through-holes, and the other openings are the "entrance" openings of the oppositely inclined blind holes. To form a flange connection, two flanges are arranged face-to-face, so that each "exit" opening is aligned with its counterpart "entrance" opening.

A preferred flange comprises an intermediate layer between the first annular connection face of the first flange-segment and the second annular connection face of the second flange-segment. Additionally or alternatively, a preferred flange comprises an intermediate layer on the third annular connection face. The intermediate layer preferably comprises a material of the group rubber, polysiloxane, epoxy resin, grout and adhesive, especially filled with metal particles. The intermediate layer should be relatively thin. In an embodiment, the thickness of the intermediate layer is less than 10 mm, preferably less than 5 mm, especially less than 1 mm. To compensate surface imperfections, the intermediate layer is preferably thicker than 0.001 mm, especially thicker than 0.01 mm. The advantage of this intermediate layer between the flange-segments and/or between flanges is an improvement concerning the connection of the components, especially regarding surface imperfections and optimal load transfer.

In difference to the second flange-segment that is not welded and therefore has a pristine surface flatness that is not distorted by heat input and internal stresses, the first flange-segment may suffer from welding it to a tower segment. Thus, the second flange-segment may enable a contact surface (second annular connection face) of excellent flatness tolerance. This is good, since gaps or protrusions have a negative impact on bolt life. However, the contact surface between the flange segments can suffer from gaps or protrusions on the first annular connection face of the first flange-segment. However, these can be compensated with the layer, e.g. a grout type of layer, or epoxy filled with metal particles, to bridge any gaps.

According to a preferred embodiment of the flange, the second flange-segment has an essentially rectangular or wedged cross section with or without rounded edges. Alternatively or additionally, the second flange-segment comprises sub-segments, e.g. rings, having an essentially rectangular or wedged cross section with or without rounded edges. This has the advantage that the second flange-segment or the sub-segments can be manufactured very easy without much waste. Another preferred shape of the second flange-segment is a stepped or deviated cross section, especially in a way that the first flange segment fits into a recess of the otherwise rectangular or wedged cross section of the second flange-segment.

According to a preferred embodiment of the flange, the primary bolt circle of the first flange-segment comprises an alternating arrangement of inclined through openings and inclined blind openings. This arrangement has already been described above and has the advantage that bolts can be oppositely arranged X-wise.

According to a preferred embodiment of the flange, the primary aperture circle (corresponding to the openings of the primary bolt circle) comprises slotted holes with the longitude arranged parallel to a radius of the annular connection faces. Concerning an embodiment of the ring-shaped second flange-segment with a rectangular cross section, the slotted holes would be perpendicular to the connection faces. The advantage of using slotted holes instead of normal holes fitting the bolts (that have to be inclined since the openings of the primary bolt circle are inclined) is that they are able to receive inclined bolts even if they are not inclined themselves.

It is preferred that a bore of the slotted holes is collinear with a surface normal of at least one of the annular connection faces, i.e., the bore is not inclined and, therefore, very easy to manufacture.

It should be noted that it is very advantageous, when the apertures of the primary aperture circle of the second flange-segment have no threads or blind openings, but preferably smooth walls so that a bolt can easily glide through them.

According to a preferred embodiment of the flange, the secondary bolt circle is outside the outer shape of the first flange-segment. This means that the first flange-segment does neither cover nor comprise the secondary bolt circle.

Thus, the first flange-section is part of the vertical line of an L-shape and the second flange-section forms the horizontal line of an L-shape. The holes in the 'L-part' are only functional when these are outside the outer shape of the first flange-section. Although the holes of the secondary bolt circle could be on the outside of the flange, it is preferred that they are facing inwards of the flange connection (the inner part of the annular flange).

According to a preferred embodiment of the flange, an inclined through opening extends through the first flange-segment (and the apertures of the second flange-segment) to accommodate the shank of a fastener extending into a complementary blind opening of the complementary flange.

Normally the diameter of the fastener shank is slightly less than the hole diameter to simplify the movement through the holes.

According to a preferred embodiment of the flange, a blind opening extends partway into the first flange-segment to accommodate the threaded end of a fastener extending into the flange after passing through an inclined through opening of the complementary flange.

A preferred embodiment of the flange comprises an alignment feature shaped to engage with an inverse alignment feature of the complementary flange. This alignment feature simplifies the correct arrangement of two complementary flanges. The alignment feature preferably comprises a number of guide pins and the inverse alignment feature comprises a number of holes designed to fit the guide pins. Guide pins are very useful for guiding flanges into place, to avoid shifting during installation and to correct ovality of the flanges.

According to a preferred embodiment of the flange, the second flange-segment is mounted to the first flange-segment by fasteners, preferably connection bolts extending through an opening, preferably perpendicular to the first and second connection face. These fasteners should not be misunderstood with the bolts connecting two flanges. They are used to assemble one flange by connecting the two flange-segments, and additionally to transfer shear load. These bolts can replace an intermediate layer as described above or work together with this intermediate layer. In an embodiment, the first flange-segment comprises multiple threads and the second flange-segment comprises multiple corresponding holes designed to receive and hold the connection bolts.

According to a preferred embodiment of the flange, the inner diameter of the first flange-segment exceeds the diameter of the second flange-segment. Thus, the second flange-segment extends further into the center of the annular flange than the first flange segment (resulting in an L-shape).

In an embodiment, the outer diameter of the first flange-segment and the second flange-segment are the same. Thus, the two flange-segments preferably have a flush fitting at the outside of the flange.

The secondary bolt circle can be based on a complete ring, or on arc-sections of a ring. When based on arc-sections of a circle, the second flange segment can be further segmented into angular sub-segments, for example each sub-segment subtending an angle of 30° to the midpoint of the flange, with four such sections evenly spaced about the inner perimeter of the first body section. Such an embodiment reduces material costs. Thus, the second flange-segment could be segmented in a number, e.g. 4, quadrants. The quadrants are preferably extracted from a thick plate, what has the advantage that this is cost saving compared to forging.

The second flange segment can also be further segmented into sub-segments that are flat rings and stacked upon another to form the second flange-segment.

As said above, the second flange-segment comprises a third annular connection face that is adapted to lie against a complementary annular connection face of the complementary flange or against a first annular connection face of another first flange-segment. This is because, a flange connection can be made by a flange according to embodiments of the invention with another flange according to embodiments of the invention (2 first flange-segments and 2 second flange-segments in total) or with a conventional flange (1 first flange-segment, 1 second flange-segment and one conventional flange). Alternatively, a flange connection may be realized by only one second flange-segment and two first flange-segments on each side of the second flange segment. Concerning this preferred embodiment, there are less segments in total, however, the primary aperture circle has to be adapted such that bolts fit through the primary bolt circles of both first flange-segments in order to bolt them together.

Thus, according to a preferred flange, the second flange-segment comprises two or more sub-segments, preferably wherein the sub-sections are arc-sections of a ring and/or rings stacked upon another and/or concentric rings.

In an embodiment of the invention, the method of handling a tower section during tower assembly comprising a step of adjusting two flanges by using a guide pin in one flange that is inserted through an opening in the complementary flange.

Further advantages of embodiments of the invention is a lower risk of non-conformances or extra testing due to the better accessibility to the functional structures and the potential to carry out NDT (phased array UT) from the surface below the weld neck. This could allow the weld neck to be reduced in height, saving even more material.

BRIEF DESCRIPTION

Some of the embodiments will be described in detail, with references to the following Figures, wherein like designations denote like members, wherein.

DETAILED DESCRIPTION

Figure 1:
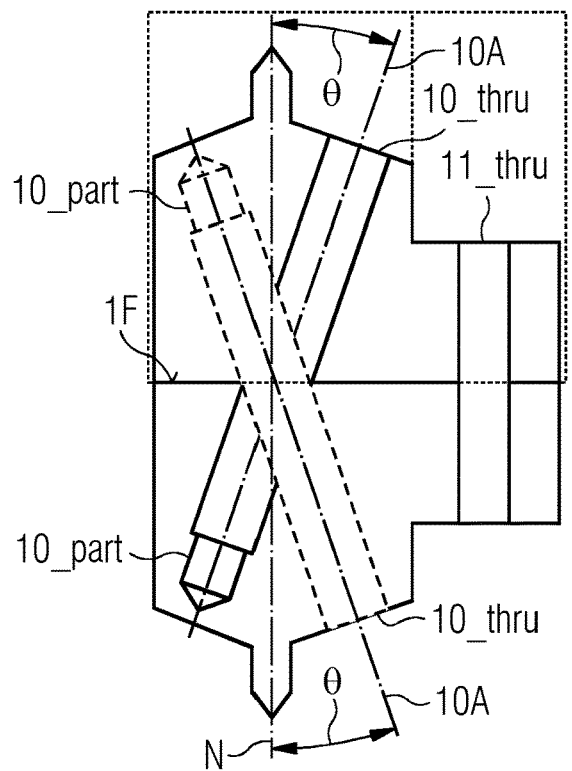
FIG. 1 shows a flange according to the conventional art.

FIG. 1 illustrates a connection between two flanges 1 according to the conventional art in cross-section. Each flange has a primary bolt circle 1P (see e.g. FIG. 4) comprising an annular arrangement of inclined openings 10_thru, 10_part to receive a set of fasteners 10B (see FIG. 6) for connecting the flange 1 to the complementary flange 1. An inclined opening 10_thru, 10_part of the primary bolt circle 1P is characterized by the angle of inclination θ subtended between its longitudinal axis 10A and a surface normal N of the flange connection face 1F. In FIG. 1, the center of the "exit" opening of the through-hole 10_thru and the center of the "entrance" opening of the blind hole 10_part are points along the primary bolt circle 1P. This is more clearly seen in the perspective view given by FIG. 4, which shows the alternating arrangement of through-hole "exit" openings 10_out and blind hole "entrance" openings 10_in that form the primary bolt circle 1P.

The flange 1 also comprises a body section (L-part) with a secondary bolt circle 1S (see FIG. 4) comprising an annular arrangement of openings 11_thru to receive a set of fasteners for connecting the flange 1 to an interim structure or to the complementary flange 1.

Concerning the above flange, there is a big, dashed box drawn around the whole flange and a smaller dashed box inside the big, dashed box. The big, dashed box shows the cross section of a ring that has to be forged in order to machine the flange out of it. The smaller dashed box shows the portion that has to be machined away just to form the L-portion of the flange. The material and the machining of the smaller box can be spared by embodiments of the invention. Since a tower section of a wind turbine and with it the flange can have a mean diameter in the order of 6-8 m, and the cross section of the raw forged part of the flange can have dimensions about 30 cm×30 cm, the spared material and machining effort is a serious advantage.

Figure 2:
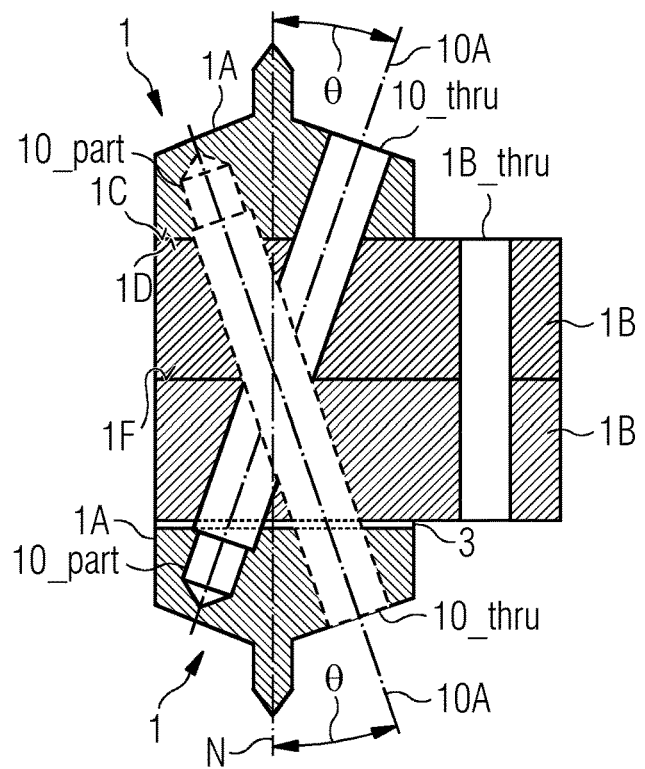
FIG. 2 shows a cross section of preferred flanges according to embodiments of the invention.

FIG. 2 shows an embodiment of two inventive flanges 1. that correspond to each other and form a flange connection (without bolts). The setup is similar to FIG. 1, with the X-shaped inclined openings 10_thru, 10_part and the openings 1B_thru in the L-part of the flange 1. In contrast to the conventional art, the flange is made from two flange-segments 1A, 1B, i.e., the first flange segment 1A being arranged on the second flange segment 1B, wherein a first annular connection face 1C of the first flange-segment 1A lies against a complementary second annular connection face 1D of the second flange-segment 1B. The flanges are in contact via their third annular connection faces 1F.

Concerning the lower flange 1, there is an additional intermediate layer 3 between the first flange-segment 1A and the second flange-segment 1B. Such intermediate layer 3 may also be arranged between the two flanges, i.e., between the third connection faces 1F.

Figure 3:
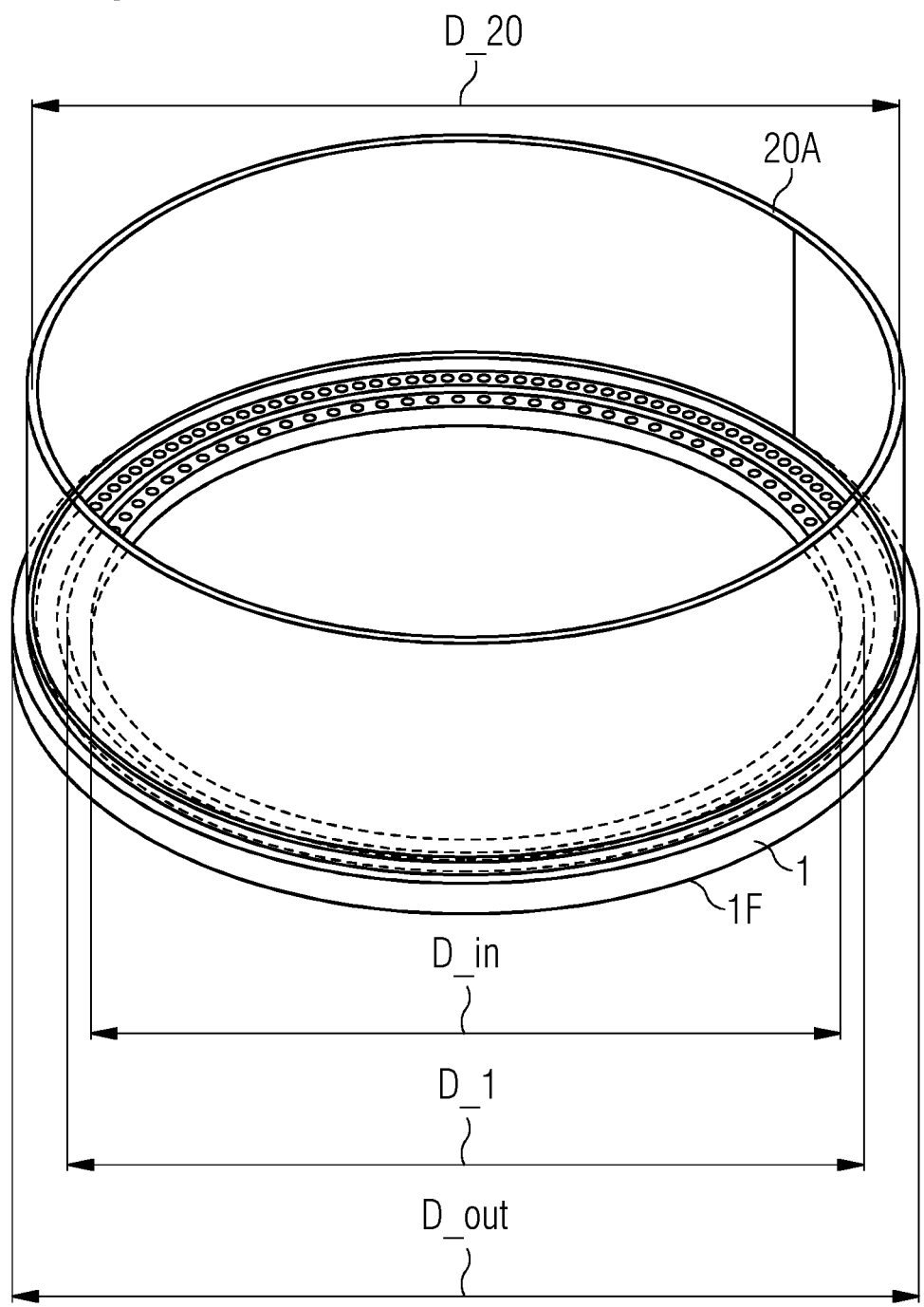
FIG. 3 shows a perspective view on a flange.
Figure 12:
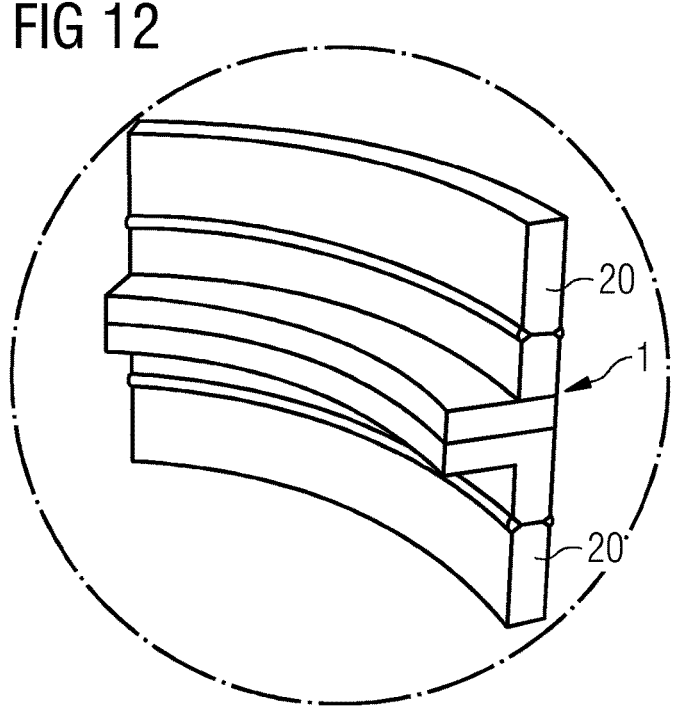
FIG. 12 shows a section of the tower according to FIG. 11.

FIG. 3 shows a perspective view on a flange 1, e.g. as part of a tower section 20 (see e.g. FIG. 12). The diagram indicates the area of the annular connection face 1F by the outer diameter D_out and the inner diameter D_in what is also the inner and outer diameter D_out of the second flange segment 1B. While the outer diameter of the first flange segment 1A corresponds with the outer diameter D_out of the second flange segment 1B, the inner diameter D_1 of the first flange-segment 1A is bigger than the inner diameter D_in of the second flange segment 1B, so that the L-part is not covered by the first flange-segment 1A.

Figure 4:
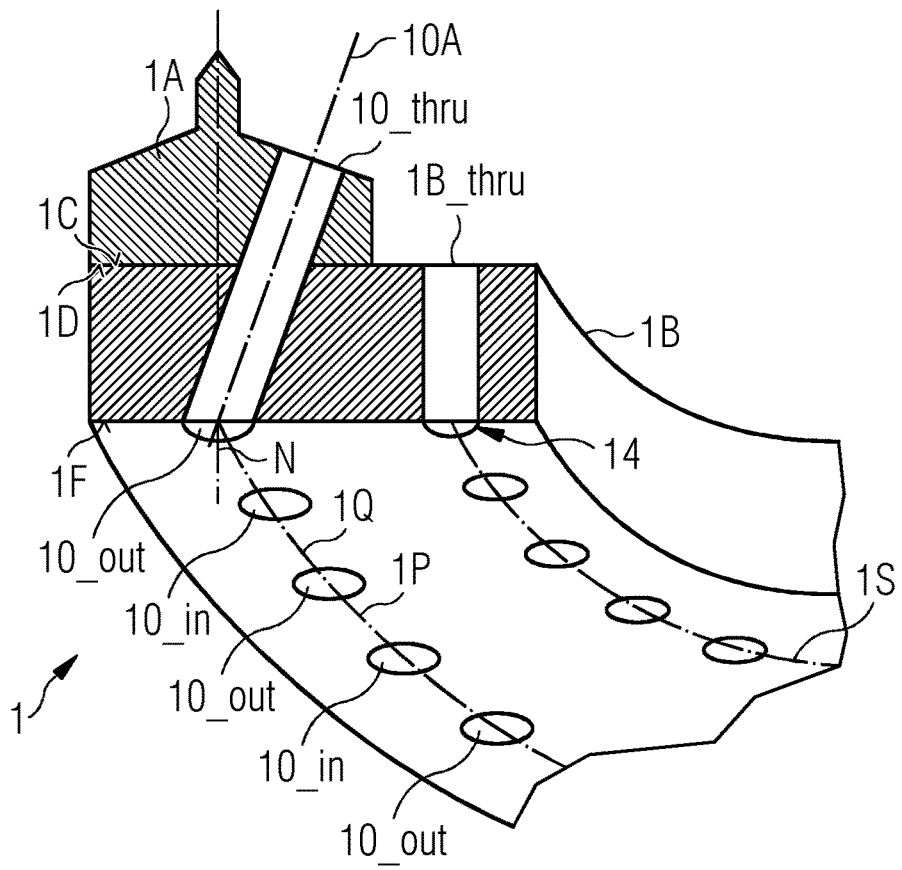
FIG. 4 shows a perspective view on a cutout of a preferred flange according to embodiments of the invention.

FIG. 4 shows a perspective view on a flange 1 that forms a circle. The flange 1 has a third connection face 1F that will lie against the third connection face of a complementary flange as shown e.g. in FIG. 2. The primary bolt circle 1P corresponds with the primary aperture circle 1Q with the difference that the primary bolt circle 1P concerns the first flange-segment 1A and the primary aperture circle 1Q concerns the second flange-segment 1B. on the right part of the second flange-segment 1B there is shown the secondary bolt circle 1S. Alternating holes refer to the exit 10_out and the entrance 10_in of bolts into or out of the flange.

Figure 5:
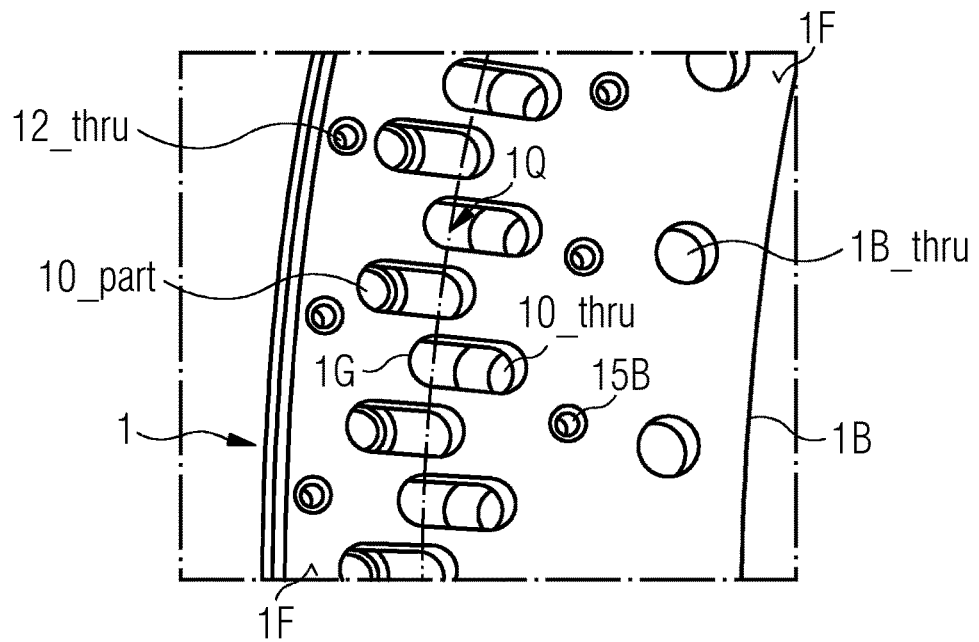
FIG. 5 shows a connection face of a preferred flange according to embodiments of the invention.

FIG. 5 shows a third connection face 1F of a preferred flange 1 according to embodiments of the invention. It can be regarded as FIG. 4 seen from the third connection face 1F with the difference that this figure shows slotted holes 1G instead of inclined holes in the primary aperture circle 1Q.

Figure 7:
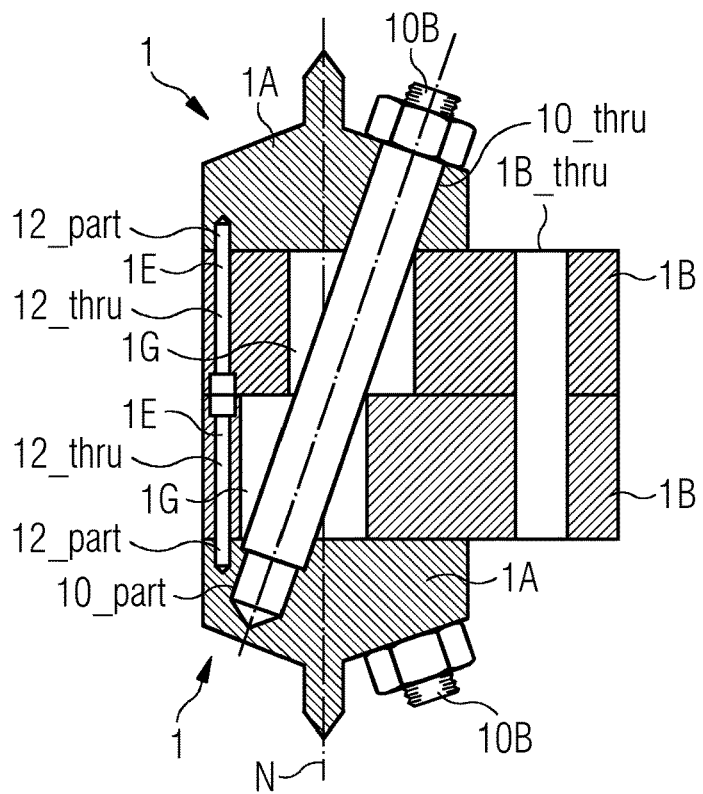
FIG. 7 shows a cross section of another preferred flanges according to embodiments of the invention.

There can be seen through-openings 12_thru for bolts 1E as shown and described in FIG. 7.

Figure 6:
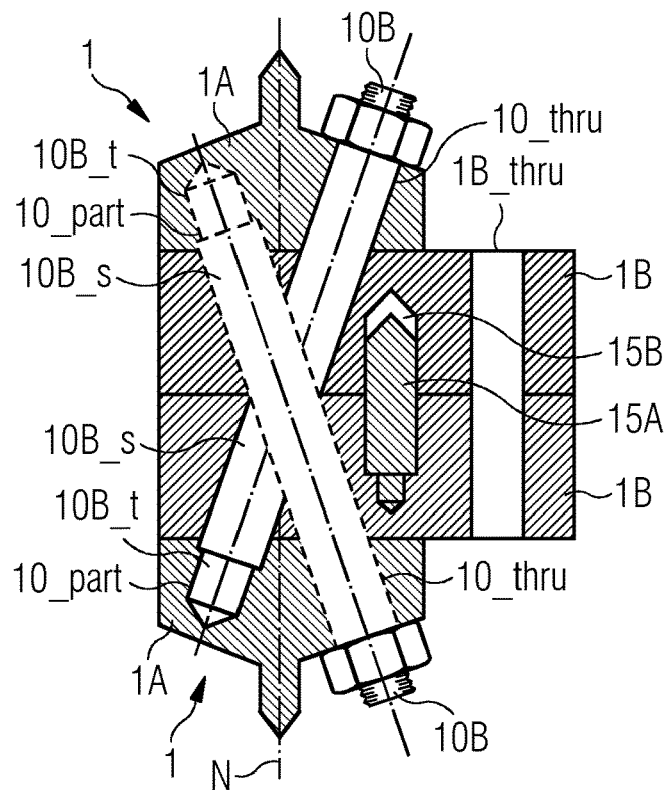
FIG. 6 shows a cross section of another preferred flanges according to embodiments of the invention.

FIG. 6 shows a cross section of another preferred flanges 1 according to embodiments of the invention, wherein the shown corresponding flanges 1 form a permanent flange connection. The connection is "permanent" in the sense that it may endure for the lifetime of the structure. Here, each flange 1 is formed to have an alignment feature 15A in form of a guide pin 15A shaped to engage with an inverse alignment feature 15B in form of a guide hole 15B of the complementary flange 1. The alignment features 15A, 15B act to correct any slight ovalization that may be present in a flange, when the tower sections are stacked. The drawing shows a fastener 10B extending through a through-hole 10_thru in the upper flange 1 and into a blind tapped opening 10_part of the lower flange 1. Here the apertures of the primary aperture circle 1Q of the second flange-segment 1B are also inclined bores fitting the through-hole 10_thru as well as the blind tapped opening 10_part of the primary bolt circle of the first flange-segment 1A.

The drawing also indicates another oppositely inclined fastener 10B extending through a through-hole 10_thru in the lower flange 1 and into a blind tapped opening 10_part of the upper flange 1.

FIG. 7 shows a cross section of another preferred flanges 1 according to embodiments of the invention similar to FIG. 7. The difference to the flanges of FIG. 7 is that there are no inclined holes in the second flange-section 1B, but slotted holes 1G as e.g. shown in FIG. 5. The slotted holes 1G are easier and cheaper to manufacture compared with inclined holes.

Furthermore, here either two flange-segments 1A, 1B of the flanges 1 comprise connection bolts 1E passing through through-openings 12_thru and being screwed in a thread in blind opening 12_part, connecting each second flange-segment 1B to the corresponding first flange-segment 1A. These connection bolts 1E could also be arranged on the right (inner) side of the flanges 1 alternatively or additionally.

Figure 8:
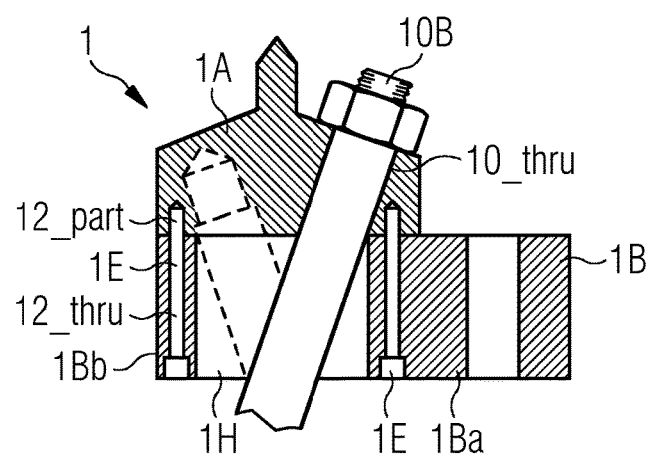
FIG. 8 shows a cross section of another preferred flange according to embodiments of the invention.

FIG. 8 shows a cross section of another preferred flange according to embodiments of the invention. Here either the slotted holes 1G have all the same size to accommodate all bolts 10B or the second flange-segment 1B comprises two rings and an intermediate space 1H between the inner ring 1Ba and the outer ring 1Bb. Both, the inner ring 1 Ba and the outer ring 1Bb are bolted to the first flange-section 1A with connection bolts 1E.

Figure 9:
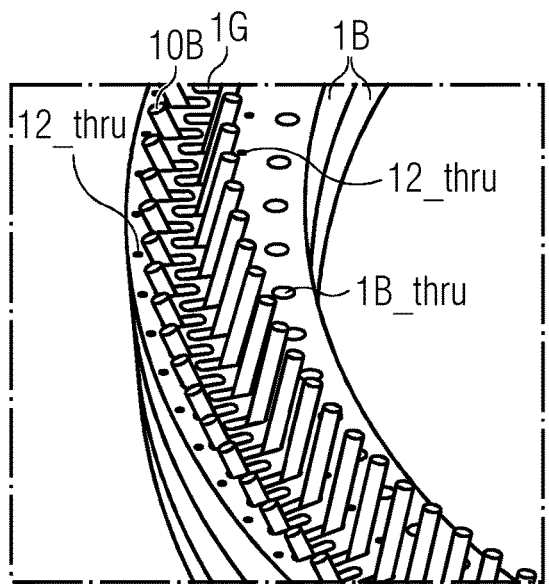
FIG. 9 shows a perspective view on parts of flanges according to embodiments of the invention.

FIG. 9 shows a perspective view on parts of flanges 1 according to embodiments of the invention. It could be assumed that flanges of FIG. 7 are shown without the upper first flange-segment 1A. The X-shaped arrangement of fasteners 10B in slotted holes 1G can be seen as well as through-openings 12_thru for connection bolts 1E in the outer area of the second flange-segment 1B and (in contrast to FIG. 7) also in the inner area of the second flange-segment 1B.

Figure 10:
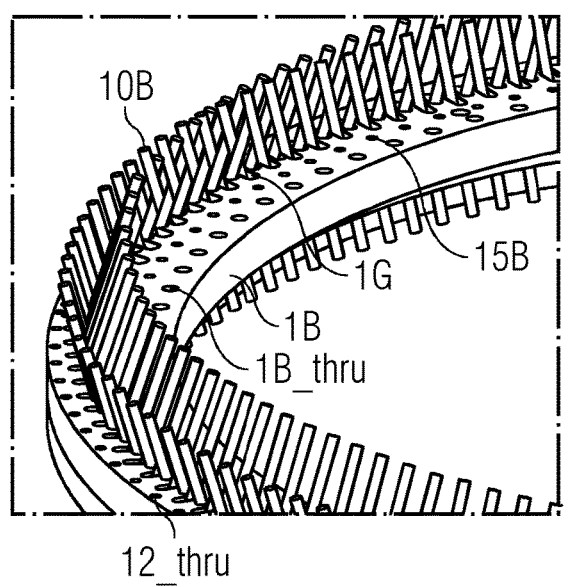
FIG. 10 shows a perspective view on parts of a flange according to embodiments of the invention.

FIG. 10 shows a perspective view on parts of a flange according to embodiments of the invention. It is a view on FIG. 9 without the upper second flange-segment 1B, i.e., only the lower flange 1.

Figure 11:
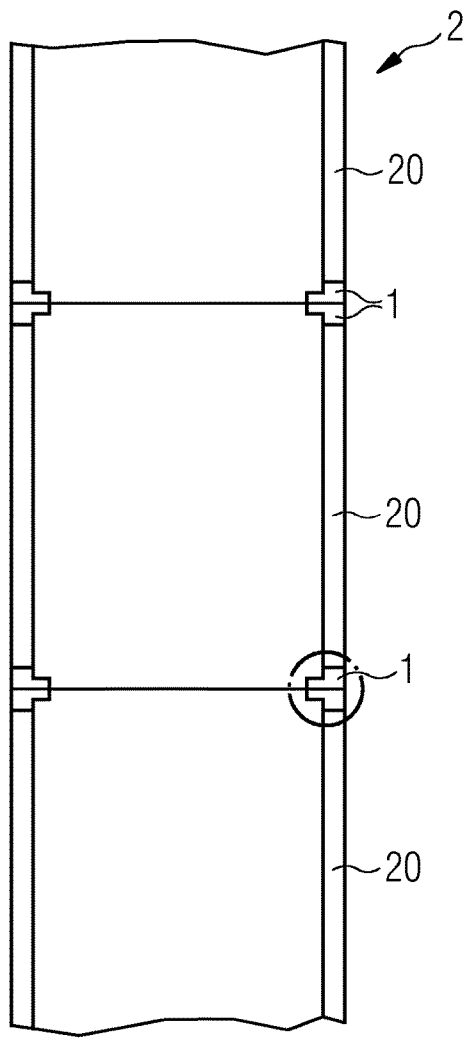
FIG. 11 shows a tower comprising stacked tower sections connected by flanges according to embodiments of the invention.

FIG. 11 shows a tower 2 such as a wind turbine tower, comprising tower sections 20 "stacked" on top of each other and connected by flanges 1 according to embodiments of the invention. The flanges are outlined without further details. The way of fastening the flanges is described more accurately in the preceding figures.

FIG. 12 shows an enlarged portion of a connection of FIG. 11 (see dash-dotted circle in FIG. 11). The tower segments 20 are welded to the flanges 1. In this figure, a flange 1 according to embodiments of the invention (upper flange) is connected to a flange according to the conventional art (lower flange). This is possible, since only the internal structures of the flanges 1 differ, but the holes used for connecting the flanges fit with each other. The flanges 1 are only symbolized. Preferred flanges 1 are shown in the preceding figures. It has to be noted that since the construction of the lower flange (state of the art) is associated with significantly higher costs as explained above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A flange for connecting to a complementary flange, the flange comprising:
   a first flange-segment arranged on top of a second flange-segment, wherein:
   a) the first flange-segment comprises:
      a primary bolt circle comprising an annular arrangement of inclined openings configured to receive a set of fasteners for connecting the flange to the complementary flange; and
      a first annular connection face facing the complementary flange and configured to lie against a complementary second annular connection face of the second flange-segment; and
   b) the second flange-segment comprises:
      on one side, a second annular connection face facing away from the complementary flange and configured to lie against the complementary first annular connection face of the first flange-segment;
      on an opposite side a third annular connection face configured to lie against a complementary annular connection face of the complementary flange or against a first annular connection face of another first flange-segment;
      a first body section with a primary aperture circle comprising an annular arrangement of openings designed to let through the set of fasteners for connecting the flange to the complementary flange to and from the primary bolt circle of the first flange-segment; and
      a second body section with a secondary bolt circle comprising an annular arrangement of openings to receive a set of fasteners for connecting the flange to an interim structure or to the complementary flange.

2. The flange according to claim 1, comprising an intermediate layer between the first annular connection face of the first flange-segment and the second annular connection face of the second flange-segment, and/or on the third annular connection face, the intermediate layer is selected from a group consisting of: rubber, polysiloxane, grout and adhesive, and epoxy resin filled with metallic particles.

3. The flange according to claim 1, wherein the second flange-segment has an essentially rectangular or wedged cross section with or without rounded edges or comprises sub-segments having an essentially rectangular or wedged cross section with or without rounded edges.

4. The flange according to claim 1, wherein the primary bolt circle of the first flange-segment comprises an alternating arrangement of inclined through openings and inclined blind openings.

5. The flange according to claim 1, wherein the primary aperture circle comprises slotted holes with a longitude arranged parallel to a radius of the annular connection faces, further wherein a bore of the slotted holes is collinear with a surface normal of at least one of the annular connection faces.

6. The flange according to claim 1, wherein the secondary bolt circle is outside an outer shape of the first flange-segment.

7. The flange according to claim 1, wherein the second flange-segment comprises two or more sub-segments, further wherein the sub-sections are arc-sections of a ring and/or rings stacked upon another and/or concentric rings.

8. The flange according to claim 1, wherein an inclined through opening extends through the first flange-segment to accommodate a shank of a fastener extending into a complementary blind opening of the complementary flange and/or wherein a blind opening extends partway into the first flange-segment to accommodate a threaded end of a fastener extending into the flange after passing through an inclined through opening of the complementary flange.

9. The flange according to claim 1, comprising an alignment feature shaped to engage with an inverse alignment feature of the complementary flange, wherein the alignment feature comprises a number of guide pins and the inverse alignment feature comprises a number of holes designed to fit the guide pins.

10. The flange according to claim 1, wherein the second flange-segment is mounted to the first flange-segment by connection bolts extending through an opening, perpendicular to the flange connection face, further wherein the first flange-segment comprises multiple threads and the second flange-segment comprises multiple corresponding holes designed to receive and hold the connection bolts.

11. The flange according to claim 1, wherein an inner diameter of the first flange-segment exceeds a diameter of the second flange-segment, further wherein the outer diameter of the first flange-segment and the second flange-segment are the same.

12. A first flange-segment designed for the flange according to claim 1, comprising:
a primary bolt circle comprising an annular arrangement of inclined openings to receive a set of fasteners for connecting the flange to the complementary flange; and
a first annular connection face configured to lie against a complementary second annular connection face of a second flange-segment of the flange.

13. A second flange-segment designed for the flange according to claim 1, comprising:
on one side a second annular connection face configured to lie against the complementary first annular connection face of a first flange-segment of the flange;
on an opposite side a third annular connection face to lie against a complementary annular connection face of the complementary flange or against a first annular connection face of another first flange-segment;
a first body section with a primary aperture circle comprising an annular arrangement of openings designed to let through a set of fasteners for connecting the flange to the complementary flange to and from the primary bolt circle of the first flange-segment; and
a second body section with a secondary bolt circle comprising an annular arrangement of openings to receive a set of fasteners for connecting the flange to an interim structure or to the complementary flange.

14. A method of assembly of the flange according to claim 1, comprising:
connecting the first flange-segment to a cylindrical tower section of a tower; and
arranging a material layer between the first flange-segment and the second flange-segment and connecting the second flange-segment to the first flange-segment with the use of connection bolts.

15. A tower for a wind turbine, the tower comprising a plurality of essentially cylindrical tower sections equipped with the flange according to claim 1 and permanently connected by fasteners inserted through the inclined openings in the primary bolt circles of the flanges.

* * * * *